United States Patent
Ditlya

(10) Patent No.: US 6,498,712 B1
(45) Date of Patent: Dec. 24, 2002

(54) VARIABLE CAPACITOR

(75) Inventor: David Ditlya, Wyckoff, NJ (US)

(73) Assignee: Voltronics Corporation, Denville, NJ (US)

(*) Notice: Subject to any disclaimer, the term of this patent is extended or adjusted under 35 U.S.C. 154(b) by 0 days.

(21) Appl. No.: 10/091,823

(22) Filed: Mar. 6, 2002

(51) Int. Cl.⁷ ................................. H01G 5/00
(52) U.S. Cl. ..................... 361/277; 361/298.2
(58) Field of Search ............... 361/277, 290, 361/299.3, 298.2, 292

(56) References Cited

U.S. PATENT DOCUMENTS

| | | |
|---|---|---|
| 3,624,469 A | 11/1971 | Johanson |
| 3,688,226 A | 8/1972 | Mezey |
| 3,808,479 A | 4/1974 | Mezey |
| 4,002,957 A | 1/1977 | Weisbrod |
| 4,007,406 A | 2/1977 | Weisbrod |
| 4,193,107 A | 3/1980 | Wagemakers et al. |
| RE30,406 E | 9/1980 | Johanson |
| 4,389,762 A | 6/1983 | Reeves |
| 4,464,699 A | 8/1984 | Bunce et al. |
| 4,490,772 A | 12/1984 | Blickstein |

FOREIGN PATENT DOCUMENTS

JP           55042140 A       3/1980

*Primary Examiner*—Anthony Dinkins
(74) *Attorney, Agent, or Firm*—Lerner, David, Littenberg, Krumholz & Mentlik, LLP

(57) ABSTRACT

A variable electronic component in the nature of a trimmed capacitor has a very low cost and simple design. A dielectric housing has an open end that a plug may be press fit into. The plug grips an upper region of the dielectric housing with at least one projection. A conductive body acts as a variable electrode, moving axially within the dielectric housing. A stator, acting as a fixed electrode, is securely affixed to an outer portion of the dielectric housing opposite the open end by crimping the top of the stator over a protrusion on an outer surface of the dielectric housing. The total press fit design reduces the number of steps normally required to make a trimmed capacitor, thereby reducing the cost of manufacture.

43 Claims, 3 Drawing Sheets

VARIABLE CAPACITOR

BACKGROUND OF THE INVENTION

The present invention relates in general to variable electronic components, and more particularly, to a variable trimmed capacitor having a design that reduces manufacturing time and cost while providing a high level of quality.

Capacitors are critical components used in a vast array of electronic devices, from simple circuit boards to entire computer systems. Capacitors have two main types, fixed and variable. A fixed capacitor has a pre-defined capacitance that is fixed during manufacturing. Variable or trimmed capacitors do not have their capacitance fixed during manufacturing. Instead, these capacitors are designed so that they afford a range of capacitance values. Adjusting along this range allows a user, for example, to fine-tune a circuit. Thus, variable capacitors are often employed in transmitter and receiver circuitry. Variable capacitors are known from U.S. Pat. Nos. 5,229,911; 5,155,654; 4,876,627; 4,764,843; and 4,575,779, all assigned to the assignee of this application, the disclosures of which are incorporated herein by reference.

Variable capacitors come in many different designs. One method of varying capacitance is to interleave several variable electrodes among fixed electrodes. See U.S. Pat. Nos. 4,002,957; 3,624,469; and Re. 30,406. Adjusting the position of the variable electrodes relative to the fixed electrodes increases or decreases the capacitance. One drawback to this kind of variable capacitor is the number of electrodes. Multiple fixed and variable electrodes necessitate a housing large enough to accommodate them. This may make these devices unsuitable for many small-scale applications. And if the fixed and variable electrodes are not carefully situated, or if the structure is not rugged enough, the capacitor may not operate properly.

Other drawbacks to variable capacitors are that the outer housing is often formed of multiple parts, and the entire structure is held together with a combination of screws, clips, soldering and other connection mechanisms. As components are added, manufacturing time and expense rise. Likewise, certain processes such as soldering or welding sections of the capacitor together also increase the cost and time of manufacturing. Furthermore, each additional step in the manufacturing process increases the chance for error, so the percentage of device failures may rise. In turn, this also drives up the cost of manufacturing.

Accordingly, there is a need for improvements in variable capacitors, and in particular, to provide a simple variable capacitor design having a minimum number of components, and for the variable capacitor to be quickly and easily assembled at a low cost.

SUMMARY OF THE INVENTION

In one embodiment of the present invention, a variable electronic component is provided. The variable electronic component comprises a dielectric housing, a conductive stator and an actuator assembly. The dielectric housing includes a hollow tubular body having an open end. The conductive stator surrounds a portion of the dielectric housing. The actuator assembly is secured within the dielectric housing. The actuator assembly includes a conductive body moveable within the hollow tubular body. The conductive body is in operative relationship with the conductive stator upon operation of the actuator assembly. The actuator assembly also has at least one projection adapted to secure the actuator assembly within the hollow tubular body at the open end.

In another embodiment of the present invention, the at least one projection includes a plurality of teeth. Preferably, the plurality of teeth circumscribe an outer surface of the actuator assembly, whereby the plurality of teeth grab into an inner surface of the hollow tubular body at the open end.

In another embodiment of the present invention, the at least one projection includes an annular ring. The annular ring surrounds an outer surface of the actuator assembly, whereby the annular ring grabs into an inner surface of the open end.

In another embodiment of the present invention, the actuator assembly is friction fit into the dielectric housing. The at least one projection digs into an inner surface of the dielectric housing.

In another embodiment of the present invention, the dielectric housing, conductive stator and the actuator assembly form a capacitor. Adjusting the actuator assembly in operative relation to the conductive stator varies a capacitance of the capacitor.

In another embodiment of the present invention, the dielectric housing includes a closed end opposing the open end. The conductive stator surrounds the portion of the dielectric housing having the closed end.

In another embodiment of the present invention, the hollow tubular body includes an outer surface. The hollow tubular body is at least partly exposed along a portion of the outer surface to the surrounding environment.

In another embodiment of the present invention, the hollow tubular body further includes an opposing closed end opposite the open end. The hollow tubular body includes an outer protrusion between the open end and the opposing closed end. The conductive stator has a portion that is attached about the outer protrusion.

In another embodiment of the present invention, the variable electronic component further includes a ring. The ring surrounds a portion of the hollow tubular body about the open end. The ring prevents the hollow tubular body from disengaging from the at least one projection.

In yet another embodiment of the present invention, a variable capacitor is provided. The variable capacitor comprises a housing of dielectric material, a plug, a metal body, a stator and an actuator. The housing of dielectric material has a closed end and an open end having an inner surface. The closed end and the open end form a bore therebetween. The plug has an outer surface and an inner opening. The outer surface includes at least one projection embedded into the inner surface, thereby securing the plug within the bore of the housing adjacent to the open end of the housing. The metal body is moveably received within the bore of the housing between the closed end and the plug. The stator surrounds an outer portion of the closed end of the housing. The actuator is received within the inner opening of the plug and is attached to the metal body. The actuator is operable to axially move the metal body within the bore of the housing in operative relationship to the stator, whereby the capacitance of the variable capacitor is altered.

In another embodiment of the present invention, the at least one projection includes a plurality of teeth. Preferably, the plurality of teeth circumscribes the outer surface of the plug, whereby the plurality of teeth digs into the inner surface of the bore.

In another embodiment of the present invention, the at least one projection includes at least one annular ring. The at least one annular ring digs into the inner surface of the bore.

In another embodiment of the present invention, the plug is press fit into the housing. Preferably, the dielectric material is polytetrafluoroethylene.

In another embodiment of the present invention, the actuator is threaded. The inner opening of the plug is reciprocally threaded to engage the actuator.

In another embodiment, the variable capacitor further includes a ring surrounding a portion of the open end. The ring prevents the inner surface from disengaging from the at least one projection.

In yet another embodiment of the present invention, a variable electronic component is provided. The variable electronic component comprises a dielectric housing, a conductive stator and an actuator assembly. The dielectric housing includes a hollow tubular body having an open end and an opposing end. The hollow tubular body includes an outer surface whereby the hollow tubular body is partly exposed along a portion of the outer surface to the surrounding environment. The conductive stator surrounds a portion of the dielectric housing at the opposing end. The actuator assembly includes a conductive body. The conductive body is moveable within the hollow tubular body in operative relationship with the conductive stator upon operation of the actuator assembly.

In another embodiment of the present invention, the dielectric housing, the conductive stator and the actuator assembly form a capacitor. Adjusting the actuator assembly in operative relationship to the conductive stator varies a capacitance of the capacitor.

In another embodiment of the present invention, the dielectric housing is a plastic material. The plastic material is preferably polytetrafluoroethylene.

In another embodiment of the present invention, the hollow tubular body is partly exposed along the portion of the outer surface adjacent the open end.

In another embodiment of the present invention, the actuator assembly further includes at least one projection. The at least one projection is adapted to secure the actuator assembly to the hollow tubular body adjacent the open end.

In another embodiment of the present invention, the variable electronic component further includes a ring surrounding a portion of the hollow tubular body about the open end. The ring prevents the hollow tubular body from disengaging from the at least one projection.

In another embodiment of the present invention, the outer surface of the dielectric housing includes an outer protrusion. The conductive stator is operable to attach to the dielectric housing about the outer protrusion.

In yet another embodiment of the present invention, a variable capacitor is provided. The variable capacitor comprises a housing of dielectric material, a stator and an actuator assembly. The housing of dielectric material has a lower region including a closed end and an upper region including an open end. The housing between the closed end and the open end have a bore therebetween. The upper region is exposed to the surrounding environment along an external surface. The stator is affixed to an outer portion of the closed end of the housing. The actuator assembly is received within the bore of the housing. Adjusting the actuator assembly alters the capacitance of the variable capacitor.

In another embodiment of the present invention, the housing is a plastic material. The housing is preferably polytetrafluoroethylene. In another embodiment of the present invention, the housing is generally cylindrical.

In yet another embodiment of the present invention, a variable electronic component is provided. The variable electronic component comprises a dielectric housing, a conductive stator and an actuator assembly. The dielectric housing includes a hollow tubular body having an open end and an opposing end. The hollow tubular body has an outer protrusion between the open end and the opposing end. The conductive stator surrounds a portion of the dielectric housing, and is attached about the outer protrusion. The actuator assembly includes a conductive body moveable within the hollow tubular body in operative relationship with the conductive stator upon operation of the actuator assembly.

In another embodiment of the present invention, the conductive stator is crimped around the outer protrusion. Preferably, the conductive stator surrounds a portion of the dielectric housing including the opposing end.

In another embodiment of the present invention, the conductive stator is attached about the outer protrusion at an area of reduced diameter.

In another embodiment of the present invention, the conductive stator is attached about the outer protrusion along a ledge of the outer protrusion.

In another embodiment of the present invention, the dielectric housing, conductive stator and the actuator assembly form a capacitor. Adjusting the actuator assembly in operative relation to the conductive stator varies a capacitance of the capacitor.

In another embodiment of the present invention, the hollow tubular body includes an outer surface. The hollow tubular body is partly exposed along a portion of the outer surface.

In another embodiment of the present invention, the actuator assembly further includes at least one projection. The at least one projection is adapted to secure the actuator assembly to the hollow tubular body adjacent the open end.

In another embodiment of the present invention, the variable electronic component further includes a ring surrounding a portion of the hollow tubular body about the open end. The ring prevents the hollow tubular body from disengaging from the at least one projection.

In yet another embodiment of the present invention, a variable capacitor is provided. The variable capacitor comprises a housing of dielectric material, a stator and an actuator assembly. The housing has a closed end and an open end forming a bore therebetween. The stator has a top and a bottom. The bottom of the stator receives the closed end of the housing. The top of the stator is affixed around an outer portion of the bore. The actuator assembly is received within the bore of the housing. Adjusting the actuator assembly alters the capacitance of the variable capacitor.

In another embodiment of the present invention, the top of the stator is crimped to the outer portion of the bore.

In another embodiment of the present invention, the top of the stator is crimped to a protrusion on the outer portion of the bore.

In another embodiment of the present invention, the top of the stator is crimped to a recess on the outer portion of the bore.

DETAILED DESCRIPTION

In describing the preferred embodiments of the subject matter illustrated and to be described with respect to the drawings, specific terminology will be resorted to for the sake of clarity. However, the invention is not intended to be limited to the specific terms so selected, and is to be understood that each specific term includes all technical equivalence which operate in a similar manner to accomplish a similar purpose.

Figure 1:
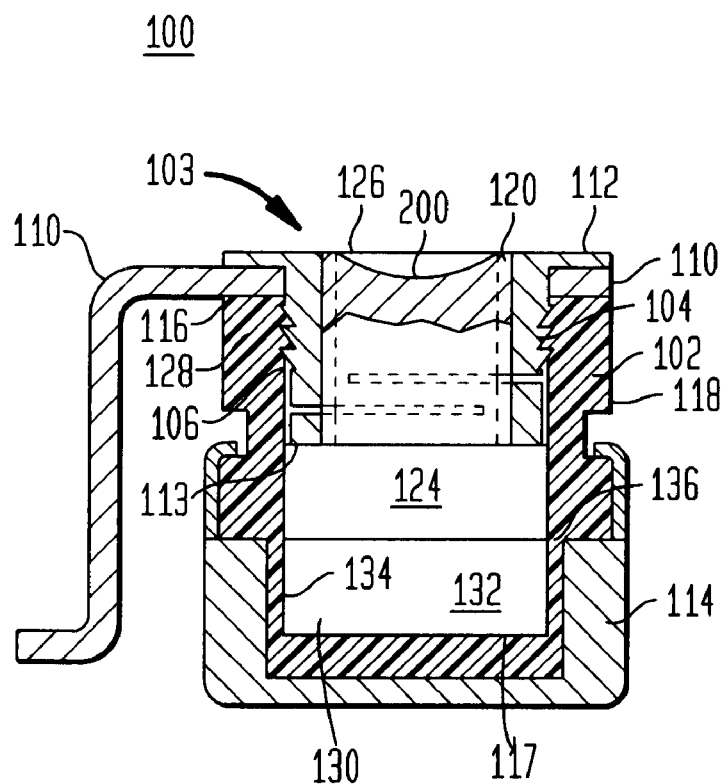
FIG. 1 is a cross-sectional illustration of a variable capacitor in accordance with an embodiment of the present invention.

The present invention will now be described in relation to the drawings, wherein like reference numbers represent like elements. FIG. 1 illustrates an embodiment of a variable capacitor according to the present invention, which has been designated generally by reference number 100. As shown in FIG. 1, the structure of the variable capacitor 100 includes a dielectric housing 102, a stator 114 and an actuator assembly 103. The housing 102 is constructed in the nature of a hollow tubular body 130 having an open end 116 and a closed end 117. The interior 132 of housing 102, defined by its inner surface 134, is substantially cylindrical. Preferably, the interior 132 will have a uniform cross-section or diameter from the open end 116 to the closed end 117 of the housing 102. The hollow tubular body 130 has an exterior surface 118, which may be cylindrical, but other shapes such as rectangular, polygonal, and the like are contemplated. The dielectric housing 102 is preferably a polymer material, such as polytetrafluoroethylene (PTFE-commonly known as Teflon®), polycarbonate, polypropylene, or polyethylene. As shown by FIG. 1, dielectric housing 102 is preferably a one-piece design formed, for instance by molding the polymer material, which in the preferred embodiment is PTFE.

Dielectric housing 102 may vary in thickness between the inner surface 134 and exterior surface 118 along the region from closed end 117 to the open end 116. For instance, the dielectric housing 102 may be thin in the region adjacent to the closed end 117, which is surrounded by the relatively thick walled stator 114, in order to vary the capacitance of the variable capacitor 100. Varying the thickness also serves to provide a protrusion 136 along a portion of exterior surface 118. Preferably, the protrusion 136 is provided along exterior surface 118 so that stator 114 can be attached thereto. Additionally, a portion of exterior surface 118 can be uncovered and exposed to the surrounding environment.

The polymer material should be rigid enough to maintain its shape without deforming yet malleable enough to securely receive the actuator assembly 103 in a compression fit as to be described. The actuator assembly 103 is secured within the open end 116 of dielectric housing 102 and is operable to vary the capacitance of the variable capacitor 100, as will be explained below.

The actuator assembly 103 is constructed from plug 104, conductive body 124, and actuator 126. Plug 104 has a cylindrical outer surface 128, a cylindrical inner opening 120, a circumscribing lip 112 and bottom edge 113. Lip 112 acts to secure conductive lead 110 to the capacitor 100. Bottom edge 113 assists in constraining the movement of conductive body 124 within interior 132 of dielectric housing 102. Outer surface 128 grips a portion of the inner surface 134 of dielectric housing 102 by the presence of at least one projection 106. Various embodiments of projection 106 are illustrated in FIGS. 2A–D.

Figure 2A:
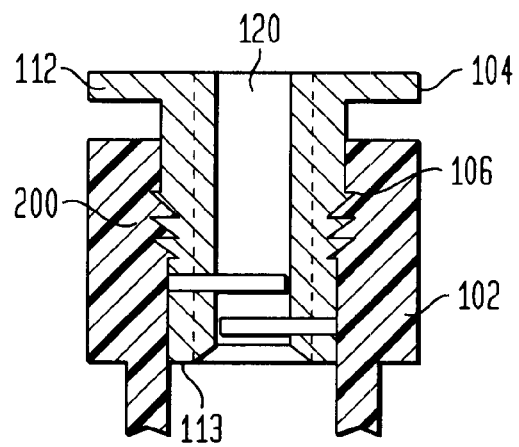
FIG. 2a is a cross-sectional illustration of a portion of the variable capacitor shown in FIG. 1 having a projection in accordance with one embodiment gripping the housing.

FIG. 2A illustrates a cross-sectional blown-up view of plug 104 engaging housing 102. In the example of FIG. 2A, the projections 106 are in the nature of a plurality of teeth-like structures formed by continuous rings about the plug 104. The projections preferably are provided with a sharp edge 200.

As plug 104 is inserted into dielectric housing 102, the teeth grip by digging into the inner surface 134 of the housing 102. This conveniently secures the plug 104 in the housing. The plug is preferably sized to be force fit into the dielectric housing 102, thereby eliminating the need if desired for soldering, screws or other expensive and time-consuming connection methods.

Figure 2B:
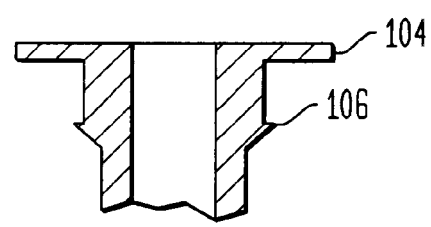
FIG. 2b is a cross-sectional illustration of a portion of the variable capacitor shown in FIG. 1 having a projection in accordance with one embodiment gripping the housing.
Figure 2C:
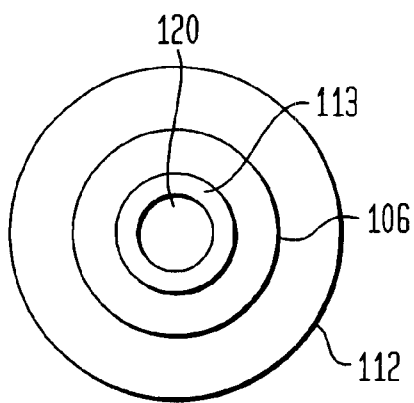
FIG. 2c is a top plan illustration of a plug for a variable capacitor, wherein a projection in accordance with one embodiment circumscribes the plug.
Figure 2D:
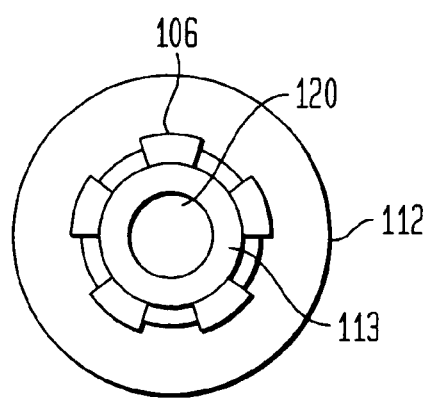
FIG. 2d is a top plan illustration of a plug for a variable capacitor, wherein projections in accordance with one embodiment do not circumscribe the plug.

Preferably, the projections 106 circumscribe the outer surface 128 of plug 104 in one or more circumscribing rings to provide adequate gripping with a portion of inner surface 134 near open end 116. Projections 106 are not limited to a plurality of teeth-like rings. Alternatively, projection 106 can be at least one annular ring, as shown in FIG. 2B. As plug 104 is inserted into housing 102, the annular ring(s) grips into the polymer material which is softer than the housing 102. As shown in the bottom plan view of FIG. 2C, the projections 106 such as the annular ring can completely circumscribe the outer surface 128 of plug 104. Alternatively, as shown in FIG. 2D, the projections 106 such as the teeth-like rings of FIG. 2A need not completely circumscribe outer surface 128 thus forming individual teeth-like projections. Other types, quantity and placement of projection 106 may be employed, and it should be understood that the invention is not limited to those specifically illustrated as described. Rather, it is contemplated that any type of projection in the plug 104 which will cooperate with the housing 102 to secure the two components together can be incorporated in accordance with the present invention. Further, it is contemplated that a groove may be formed in the inner surface 14 of the housing 102 to receive the projection 106 in a locking arrangement.

Returning to FIG. 1, conductive body 124 is disposed within the interior 132 of hollow tubular body 130. Conductive body 124 is moveable within the hollow tubular body 130, and acts as a variable electrode. Conductive body 124 is preferably adjustable between the bottom edge 113 of plug 104 and the closed end 117 of the hollow tubular body 130. Preferably, conductive body 124 is a metal, such as of copper-based alloys, brass-beryllium-copper, phosphor bronze, zinc-plated metal, metal coated plastic and the like.

The conductive body 124 is attached at one end to the actuator 126. Alternatively, conductive body 124 and actuator 126 may comprise a one-piece structure. Actuator 126 is formed of a conductive material, preferably the same type of metal as conductive body 124. Actuator 126 is adjustable within inner opening 120 of plug 104. For example, actuator 126 may be threadedly engaged with inner opening 120. Preferably, actuator 126 has a groove 200 at the end opposite conductive body 124 such that the actuator 126 can be rotated through the threading with a screwdriver. As will be apparent to those skilled in the art, other means to adjust the actuator 126 within dielectric housing 102 may be employed.

Figure 3:
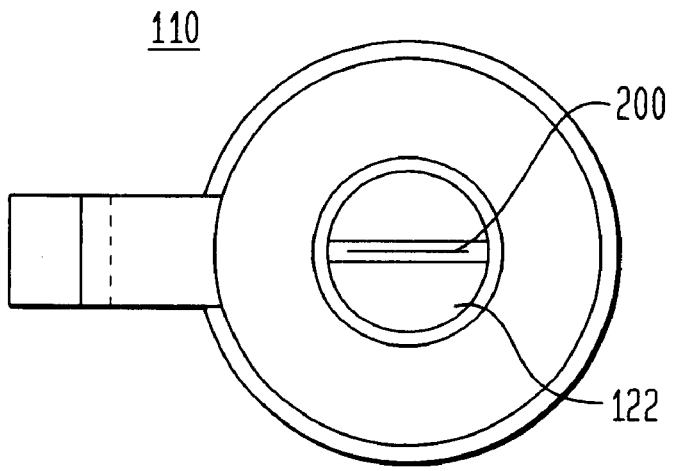
FIG. 3 is a top plan illustration of a portion of the variable capacitor shown in FIG. 1.

FIG. 1 shows a lead 110 disposed between the top of open end 116 and the lip 112 of plug 104. The lead 110 provides an electrical contact to conductive body 124 through plug 104 and actuator 126. FIG. 3 illustrates a top view of lead 110. Inner opening 122 preferably has the same shape as outer surface 128 of plug 104. Preferably, lead 110 is placed on top of open end 116 and is secured between the top of open end 116 and lip 112 of plug 104 as plug 104 is pressed into open end 116. Because projection 106 secures plug 104 into dielectric housing 102, soldering or additional components are unnecessary to secure lead 110.

Returning to FIG. 1, stator 114, having a cup shape, receives a bottom portion of dielectric housing 102 including closed end 117. The bottom of the cup shape is preferably closed, with the bottom substantially encompassing closed end 117. The sides of stator 114 can vary in thickness. The sides may be thicker near the region adjacent to the closed end 117 in order to support the correspondingly thinner portion of dielectric housing 102 in the same region. The top of stator 114 is attached about protrusion 136 of exterior surface 118. Stator 114 is preferably affixed by crimping the top of the stator around the protrusion 136. Crimping, as used herein, means to press or pinch an object into small regular folds or ridges. Crimping acts to secure the stator 114 to the dielectric housing 102 without resorting to soldering the two units together or joining them with additional components. Thus it is evident that crimping stator 114 to dielectric housing 102 can reduce the cost of manufacturing capacitor 100.

Stator 114 is formed of a conductive material, preferably a metal, which can be similar to that of the conductive body 124. Stator 114 preferably acts as a fixed electrode or electrical contact. For instance, capacitor 100 can be affixed to a circuit board by soldering stator 114 to the circuit board.

The capacitor 100 can be fabricated in the following manner by way of one example. First, conductive body 124 is secured to actuator 126. Next, actuator 126 is threaded into inner opening 120 of plug 104. Then, lead 110 is placed over open end 116 of dielectric housing 102. Next, plug 104 is press fit into open end 116 with projection 106 gripping into the polymer material of dielectric housing 102. Lead 110 is secured to dielectric housing 102 by lip 112 of plug 104 as the plug 104 is press fit into open end 116. Then, stator 114 receives a portion of dielectric housing 102, preferably including closed end 117. The top of stator 114 is crimped around recess or protrusion 136 of exterior surface 118, securing the dielectric housing 102 and the stator 114 together. This method of fabrication illustrates that a variable capacitor of the present invention may be easily and rapidly constructed using a few components without the need for soldering, welding or other time-consuming and/or expensive processes. Other methods of fabrication and variations on this method of fabrication will be apparent to those skilled in the art.

After fabrication, capacitor 100 is, for example, placed on a circuit board for use in an electrical circuit. Lead 110 and stator 114 are preferably soldered to the circuit board. Once affixed to the circuit board, variable capacitor 100 is operable to effectuate a variable capacitance. For example, a voltage may be applied to one or both of conductive body 124 and stator 114 such that a voltage difference is created between the two components. The voltage difference gives rise to a capacitance that can be used in operation of the electrical circuit. Adjusting conductive body 124 with actuator 126 moves conductive body 124 within interior 132. Moving conductive body 124 closer to closed end 117 increases the relative area of conductive body 124 in overlapping relationship with the stator 114 in the region spanned by the thinner portion of dielectric housing 102, which may alter the capacitance of variable capacitor 100. For example, the variable capacitor of FIG. 1 may have an adjustable capacitance of between about 0.6 to 3.0 pF.

Figure 4:
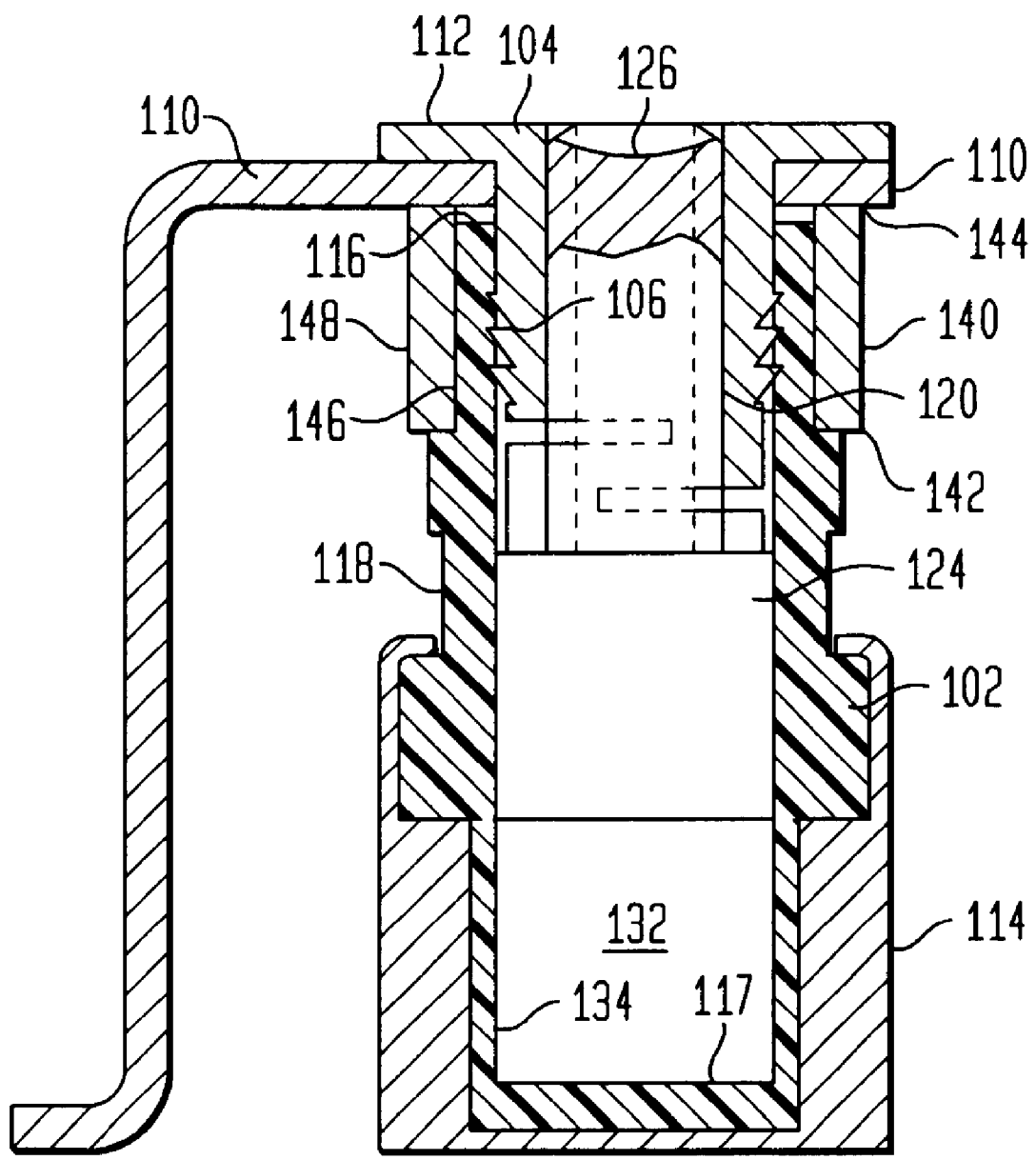
FIG. 4 is a cross-sectional illustration of a variable capacitor in accordance with a preferred embodiment of the present invention.

FIG. 4 illustrates a preferred embodiment of capacitor 100. This preferred embodiment includes a dielectric housing 102, a stator 114, an actuator assembly 103, lead 110 and ring 140. As described above in relation to FIG. 1, dielectric housing 102 is formed of hollow tubular body 130 having open end 116 and closed end 117. Interior 132 of housing 102, having inner surface 134, is substantially cylindrical.

As with the embodiment of FIG. 1, dielectric housing 102 preferably varies in thickness between the inner surface 134 and exterior surface 118 along the region from closed end 117 to open end 116. In addition to the protrusion 136 that stator 114 can attach about, exterior surface 118 may include a shelf 138 to support ring 140. Ring 140 rests upon the shelf, which prevents the ring 140 from sliding down exterior surface 118 while aligning the ring opposing the projection 106.

Ring 140 encompasses a top portion of exterior surface 118. Ring 140 has a bottom 142, a top 144, an interior 146 and an exterior 148. Bottom 142 rests on the shelf 138 of exterior surface 118. Top 144 supports lead 110 and compresses the lead into contact with the lip 112 of the plug 104. Because polymer materials may tend to flow, it is possible for the polymer material to disengage from projection 106. Ring 140 exerts a compressive or restraining force on the polymer material, preventing it from flowing and disengaging from projection 106. Ring 140 is preferably a metal, such as brass. Preferably, interior 146 is shaped to securely fit about the top portion of exterior surface 118 between shelf 138 and open end 116. Exterior 148 may be cylindrical, but other shapes such as rectangular, polygonal and the like are contemplated.

The stator 114, actuator assembly 103 and lead 110 of the preferred embodiment have the same form and function as described in the embodiment of FIG. 1. The capacitor illustrated in the preferred embodiment of FIG. 4 can be fabricated in the following manner. First, ring 140 is placed over open end 116 of dielectric housing 102. The ring 140 is slid down exterior surface 118 until the bottom 142 of ring 140 contacts the shelf 138 of exterior surface 118. Next, lead 110 is placed onto ring 140 so that lead 110 contacts top 144. Then actuator assembly 103 is pressed into open end 116. Ring 140 and lead 110 are secured to capacitor 100 by lip 112 as the projection 106 of the actuator assembly 103 grips into the polymer material of dielectric housing 102. Lip 112 of plug 104 covers a portion of lead 110, preventing the lead 110 from coming off of the capacitor 100. Next, the dielectric housing 102 inserted into stator 114. Alternatively, stator 114 is placed about the closed end 117 of dielectric housing 102. Then the top of stator 114 is secured about the protrusion 136 of exterior surface 118 of dielectric housing 102. Stator 114 is preferably secured by crimping its top about the recess or protrusion 136. After the capacitor 100 has been fabricated, it may be employed in an electrical circuit, for example, by soldering the lead 110 and stator 114 to the appropriate connections of the circuit.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A variable electronic component comprising:
   a dielectric housing including a hollow tubular body having an open end;
   a conductive stator surrounding a portion of the dielectric housing; and
   an actuator assembly secured within the dielectric housing, the actuator assembly including a conductive body moveable within the hollow tubular body in operative relationship with the conductive stator upon operation of the actuator assembly, the actuator assembly having at least one projection adapted to secure the actuator assembly within the hollow tubular body at the open end.

2. The variable electronic component of claim 1, wherein the at least one projection includes a sharp edge.

3. The variable electronic component of claim 2, wherein said at least projections comprise a plurality of teeth circumscribing an outer surface of the actuator assembly, whereby the plurality of teeth grab into an inner surface of the hollow tubular body at the open end of said housing.

4. The variable electronic component of claim 1, wherein the at least one projection comprises an annular ring surrounding an outer surface of the actuator assembly, whereby the annular ring grabs into an inner surface of the open end of said housing.

5. The variable electronic component of claim 1, wherein the actuator assembly is friction fit into the dielectric housing, whereby the at least one projection digs into an inner surface of the dielectric housing.

6. The variable electronic component of claim 1, wherein the dielectric housing, the conductive stator and the actuator assembly form a capacitor, whereby adjusting the actuator assembly in operative relation to the conductive stator varies a capacitance of the capacitor.

7. The variable electronic component of claim 1, wherein the dielectric housing includes a closed end opposing said open end, whereby the conductive stator surrounds the portion of the dielectric housing having the closed end.

8. The variable electronic component of claim 1, wherein the hollow tubular body includes an outer surface, whereby the hollow tubular body is at least partly exposed along a portion of the outer surface to the surrounding environment.

9. The variable electronic component of claim 1, wherein the hollow tubular body further includes an opposing closed end opposite the open end, the hollow tubular body having an outer protrusion between the open end and the opposing closed end, the conductive stator having a portion attached about the outer protrusion.

10. The variable electronic component of claim 1, further including a ring surrounding a portion of the hollow tubular body about the open end, whereby the ring prevents the hollow tubular body from disengaging from the at least one projection.

11. A variable capacitor comprising:
   a housing of dielectric material having a closed end and an open end having an inner surface, the closed end and the open end forming a bore therebetween;
   a plug having an outer surface and an inner opening, the outer surface including at least one projection embedded into the inner surface thereby securing the plug within the bore of the housing adjacent to the open end of the housing;
   a metal body moveably received with the bore of the housing between the closed end and the plug;
   a stator surrounding an outer portion of the closed end of the housing; and
   an actuator received within the inner opening of the plug and attached to the metal body, wherein the actuator is operable to axially move the metal body within the bore of the housing in operative relationship to the stator, whereby the capacitance of the variable capacitor is altered.

12. The variable capacitor of claim 11, wherein the at least one projection includes a sharp edge.

13. The variable capacitor of claim 12, wherein said at least one projection comprises a plurality of teeth circumscribe the outer surface of the plug, whereby the plurality of teeth dig into the inner surface of the bore.

14. The variable capacitor of claim 11, wherein the at least one projection comprises at least one annular ring, whereby the at least one annular ring digs into the inner surface of the bore.

15. The variable capacitor of claim 11, wherein the plug is press fit into the housing.

16. The variable capacitor of claim 11, wherein the dielectric material is polytetrafluoroethylene.

17. The variable capacitor of claim 11, wherein the actuator is threaded and the inner opening of the plug is reciprocally threaded to engage the actuator.

18. The variable capacitor of claim 11, further including a ring surrounding a portion of the open end, whereby the ring prevents the inner surface from disengaging from the at least one projection.

19. A variable electronic component comprising:
   a dielectric housing including a hollow tubular body having an open end and an opposing end, the hollow tubular body having an outer surface whereby the hollow tubular body is partly exposed along a portion of the outer surface to the surrounding environment;
   a conductive stator surrounding a portion of the dielectric housing at the opposing end; and
   an actuator assembly including a conductive body moveable within the hollow tubular body in operative relationship with the conductive stator upon operation of the actuator assembly.

20. The variable electronic component of claim 19, wherein the dielectric housing, the conductive stator and the actuator assembly form a capacitor, whereby adjusting the actuator assembly in operative relation to the conductive stator varies a capacitance of the capacitor.

21. The variable electronic component of claim 19, wherein the dielectric housing is a plastic material.

22. The variable electronic component of claim 21, wherein the plastic material is polytetrafluoroethylene.

23. The variable electronic component of claim 19, wherein the hollow tubular body is partly exposed along the portion of the outer surface adjacent the open end.

24. The variable electronic component of claim 19, wherein the actuator assembly further includes at least one projection adapted to secure the actuator assembly to the hollow tubular body adjacent the open end.

25. The variable electronic component of claim 24, further including a ring surrounding a portion of the hollow tubular body about the open end, whereby the ring prevents the hollow tubular body from disengaging from the at least one projection.

26. The variable electronic component of claim 19, wherein the outer surface of the dielectric housing includes an outer protrusion, whereby the conductive stator is operable to attach to the dielectric housing about the outer protrusion.

27. A variable capacitor comprising:
   a housing of dielectric material having a lower region including a closed end and an upper region including an open end, the housing between the closed end and the open end having a bore therebetween and the upper region being exposed to the surrounding environment along an external surface;
   a stator affixed to an outer portion of the closed end of the housing; and
   an actuator assembly received within the bore of the housing, whereby the capacitance of the variable capacitor is altered by adjusting the actuator assembly.

28. The variable capacitor of claim 27, wherein the housing is a plastic material.

29. The variable capacitor of claim 27, wherein the housing is polytetrafluoroethylene.

30. The variable capacitor of claim 27, wherein the housing is generally cylindrical.

31. A variable electronic component comprising:
   a dielectric housing including a hollow tubular body having an open end and an opposing end, the hollow tubular body having an outer protrusion between the open end and the opposing end;
   a conductive stator surrounding a portion of the dielectric housing and attached about the outer protrusion; and
   an actuator assembly including a conductive body moveable within the hollow tubular body in operative relationship with the conductive stator upon operation of the actuator assembly.

32. The variable electronic component of claim 31, wherein the conductive stator is crimped around the outer protrusion.

33. The variable electronic component of claim 31, wherein the conductive stator surrounds a portion of the dielectric housing including the opposing end.

34. The variable electronic component of claim 31, wherein the conductive stator is attached about the outer protrusion at an area of reduced diameter.

35. The variable electronic component of claim 31, wherein the conductive stator is attached about the outer protrusion along a ledge of the outer protrusion.

36. The variable electronic component of claim 31, wherein the dielectric housing, the conductive stator and the actuator assembly form a capacitor, whereby adjusting the actuator assembly in operative relation to the conductive stator varies a capacitance of the capacitor.

37. The variable electronic component of claim 31, wherein the hollow tubular body includes an outer surface, whereby the hollow tubular body is partly exposed along a portion of the outer surface.

38. The variable electronic component of claim 31, wherein the actuator assembly further includes at least one projection adapted to secure the actuator assembly to the hollow tubular body adjacent the open end.

39. The variable electronic component of claim 38, further including a ring surrounding a portion of the hollow tubular body about the open end, whereby the ring prevents the hollow tubular body from disengaging from the at least one projection.

40. A variable capacitor comprising:
   a housing of dielectric material having a closed end and an open end forming a bore therebetween;
   a stator having a top and a bottom, the bottom of the stator receiving the closed end of the housing and the top of the stator affixed around an outer portion of the housing; and
   an actuator assembly received within the bore of the housing, whereby the capacitance of the capacitor is altered by adjusting the actuator assembly.

41. The variable capacitor of claim 40, wherein the top of the stator is crimped to the outer portion of the housing.

42. The variable capacitor of claim 41, wherein the top of the stator is crimped to a protrusion on the outer portion of the housing.

43. The variable capacitor of claim 41, wherein the top of the stator is crimped to a recess on the outer portion of the housing.

* * * * *